3,489,699
CORE-SHELL GRAFT COPOLYMERS WITH ION EXCHANGE RESIN SHELL
Hendrik A. J. Battaerd and Geoffrey W. Tregear, North Clayton, Victoria, Australia, assignors to Imperial Chemical Industries of Australia and New Zealand Limited, Melbourne, Victoria, Australia, a company of Victoria, Australia
No Drawing. Filed Dec. 26, 1967, Ser. No. 693,164
Claims priority, application Australia, Jan. 23, 1967, 16,766/67
Int. Cl. C08g 1/34
U.S. Cl. 260—2.1                    9 Claims

ABSTRACT OF THE DISCLOSURE

A graft copolymer wherein a reactive polymer is grafted on to and surrounds, in the form of a shell, an inert polymeric nucleus; the copolymeric shell carries or is capable of incorporation of an ion exchange reactive group and the graft copolymers are suitable as ion exchange resins affording high reaction rates and high rates of equilibration.

---

This invention relates to new and useful polymeric plastic materials; more particularly it relates to graft copolymers, to processes of their manufacture and to their use, for example, in methods of ion exchange.

Ion exchangers are insoluble solid materials which carry exchangeable cations or anions. These ions may be exchanged for other ions of the same sign when the ion exchanger is in contact with, for example, an electrolyte solution. Ion exchangers may, for purposes of convenience in description, be divided into several types, for example strongly acidic cationic, weakly acidic cationic, strongly basic anionic, weakly basic anionic or those which contain functional groups which can form for example, chelates or complexes with ions. Ion exchangers consist of a framework carrying a positive or negative electric surplus charge which is compensated by mobile counter ions of opposite sign. Cation exchangers contain cations, and anion exchangers contain anions as counter ions which can be exchanged for other ions of the same sign. The exchange is stoichiometric and, as a rule, reversible, thus enabling exhausted ion exchangers to be regenerated. Usually the ion exchanger is selective, i.e. it takes up certain counter ions in preference to others. It may also sorb solvent and solutes and even precipitates may be removed from suspensions by treating the suspensions with an ion exchanger.

It is known from the book "Ion Exchange," F. Helfferich, McGraw-Hill Book Co. Inc., 1962, page 317, that ion exchange is a diffusion process and its mechanism is a redistribution within the system of the counter ions by diffusion. The co-ion, by which term we mean the ionic species with the same charge sign as the exchanger framework, has relatively little effect on the kinetics and the rate of ion exchange. One of the rate determining steps in ion exchange is interdiffusion of the exchanging counter ions either within the ion exchanger itself (particle diffusion) or in a liquid layer which adheres to the surface of the exchanger—said liquid layer being known as a film—which is not affected by agitation of the solution (film diffusion). In conventional ion exchange media film diffusion is favoured by several factors, for example by high capacity, low degree of cross-linking, and small particle size of the ion exchanger; by low concentration and weak agitation of the solution; and by preference for the ion which is taken up from the solution.

In general, ion exchangers of the resinous type swell or shrink with absorption or desorption of a liquid and this characteristic is dependent, among other factors, on the type of liquid being treated, the ionic concentration of the solution or on the particular ionic state of the resin. The rate at which ion exchange resins can take up or liberate ions and the degree and rate of swelling or de-swelling of the resin are finite for any particular resin when used for the treatment of a particular electrolyte. Experience in the use of ion exchange resins has shown that the useful capacity of these resins to remove ions from an electrolyte is lower than their equilibrium capacity and hence their full theoretical capacity cannot be used in practice. It has often been recognised that such resins require to be regenerated when only about half, and sometimes less than half, of their available equilibrium capacity has been utilised. It has also been realised that, whilst capacities of known ion exchange resins have often been high, the time for them to reach equilibrium is uneconomically long for many applications.

In referring to the capacity of ion exchange media in this document we have used the definitions in the book "Ion Exchange," F. Helfferich, McGraw-Hill Book Co. Inc., 1962, Table 4–1, p. 73.

It is known from D. E. Weiss, Aust. J. Appl. Sci. 4 (4), 510 (1953) that ion exchange media may be made of two-layered components which are physically attached to each other and at least one of which is an inert inorganic material. These media suffer from the disadvantage that it is difficult to obtain adequate adhesion between the layers; consequently they are prone to breakage and the outer layer is separated too rapidly from the inner layer as a result of attrition in use. Weiss has also described the advantages which can accrue from the use of absorbent and ion exchange materials in which the reactive layer is localised in the outer shell of the particle, particularly for continuous countercurrent adsorption processes as in the so-called "Sirotherm" process where the rate of achieving equilibrium is more critical than mere capacity.

We have found novel types of ion exchange material which have improved characteristics; thus, for example, they absorb and desorb at a faster rate, reach their equilibrium capacity more rapidly than conventional ion exchange media and have improved resistance to attrition. These resins are particularly useful in processes where the rate of equilibration is more important than capacity.

Weiss has already pointed out that an ion exchange resin may be considered as consisting of two parts, namely an inner core and an outer shell surrounding it; the inner core is less effective in ion exchange processes than the outer shell. We have now found a process by which the inner core may be formed from a solid, inert, non-swelling polymeric nucleus which does not take part in and does not interfere with the ion exchange reaction, yet can be chemically bonded to the outer shell to provide support for it without the need for cross-linking. The ion exchange reaction can then be localised in the outer shell where entry and exit of the reactants in ion exchange reactions is fastest. In addition, non-crosslinked ion exchange resin shells can be used, which are penetrated more quickly than similar crosslinked materials. Thus, extremely fast, clean and reproducibly reacting ion exchange particles can be made. In its broadest concept our invention provides therefore a graft copolymer in particulate form comprising a discrete polymeric nucleus which is non-reactive in ion exchange reactions and has grafted on to it and surrounding it a graft-copolymeric layer capable of being converted to or acting as an ion exchange medium.

Accordingly we provide shaped graft copolymers comprising a polymeric nucleus having grafted on to and around it an outer polymeric shell characterised in that substantially the whole of the nucleus is free from the co-mer units forming the outer shell, is insoluble and substantially non-swelling in the monomer or medium used in the grafting process of the outer shell and characterised further in that the polymeric shell is covalently bonded to the polymeric nucleus, surrounds it substantially symmetrically and is capable of carrying or carries ion exchange reactive groups. Preferably the outer shell comprises between 0.1 and 55% by weight and more preferably between 2 and 30% by weight of the copolymer particle. Optionally the nucleus may be crosslinked.

The polymeric nucleus may be a homopolymer or a copolymer. Although nuclei may be of irregular shape, regular geometrical shapes, for example cubes, polyhedrons and, particularly, spheres are preferred. Exact geometrical regularity is not critical. Spherical polymeric particles having a known average diameter and having a narrow particle size distribution may be prepared from the corresponding irregularly shaped polymeric particles as described in our co-pending Australian patent application No. 15,885/66. A suitable diameter for spherical polymeric nuclei is in the range from 0.1 to 2 mm. and from 0.1 mm. to 0.5 mm. is preferred.

The shell which surrounds the nucleus may be an essentially homogeneous polymeric or a copolymeric stratum grafted on to the nucleus; preferably it is of uniform thickness and completely encloses the inert nucleus. By "completely enclosed" we mean that the shell polymer is so closely packed that no continuous area of the surface of the nucleus in excess of one square micron is uncovered. The thickness and mass of the shell is, of course, related to the amount of grafted co-mer and also depends on the molecular weight of the shell polymer the size of the co-mer and the shape of the nucleus. In the case of a spherical particle we refer, for ease of description, to the radius of the inert nucleus as $r$ and the overall radius of the spherical particle as R, that is to say the thickness of the outer shell is (R-$r$). Satisfactory copolymers may be obtained when $r/R$ is as high as 0.9996, i.e. the thickness of the shell is relatively small and it may be as low as 0.765, i.e. a relatively thick shell is formed. We prefer that $r/R$ has values ranging from 0.993 to 0.89, which corresponds to about 2 to 30 parts by weight of copolymer in the shell per 100 parts of complete particle.

The polymeric substance used as nucleus in accordance with our invention should be insoluble in and substantially non-swellable by the co-mer from which the outer shell is formed. It should also be inert to the materials with which it may, at least to some extent, e.g. by diffusion through the shell, come into contact in subsequent use, for example in chromatographic or ion exchange processes or in other applications hereinafter described. It should, of course, be capable of forming a graft with the co-mer forming the outer shell. Preferably it should be amenable to processes whereby it may be shaped, most preferably into spheres, by known methods such as granular, pearl or dispersion polymerisation or by the processes described in Belgian Patent No. 676,722 or our copending Australian patent application No. 15,885/66. Within these general requirements the choice of the polymer is not critical; thus stable thermoplastic polymers are suitable and particularly convenient because of the greater ease of forming spheres from them, but thermosetting polymers are not excluded. Suitable polymers are, for example, polyolefines, polyvinyl compounds including aromatic polyvinyl compounds, polyvinylidenes, polysiloxanes, polydienes, polyethers, polyimides or polysulphones. Polyesters, polyamides, polyurethanes, polycarbonates, polyimines or polyureas are also suitable under mild conditions.

Suitable polyolefines are e.g. low and high density polyethylenes, polypropylene, polybutene, poly-4-methylpentene-(-1) and copolymers of alpha olefines with each other or with substituted vinyl and/or vinylidene monomers, e.g. vinyl esters, vinyl ethers or vinyl aromatic compounds. The polyolefines may also be totally substituted with halogens, e.g. polytetrafluoroethylene or poly(monochlorotrifluoroethylene).

Suitable vinyl and vinylidene polymers are, for example, polyvinyl chloride, polyvinyl fluoride, polyvinylidene chloride, polystyrene and substituted polystyrenes, polyacrylates, polymethacrylates, polyacrylamides and copolymers of the corresponding monomers. Particularly suitable for the formation of nuclei are polyethylene, polytetrafluoroethylene and polypropylene.

Where it is desirable to use particles of a density greater than that of the polymer nucleus, the polymer may be compounded with a heavier inert filler and converted to suitable shapes. Suitable fillers are, for example, silica, siliceous earths, aluminous earths, zirconia, titania or barium sulphate in a finely divided form.

For the purposes of this invention it is desirable that the nucleus should have good physical strength. Although many polymeric materials lend themselves admirably to our purposes without modification, it may be desirable to increase the physical strength for certain applications or certain polymers by cross-linking.

A first class of monomers suitable for grafting on to the polymer nucleus comprises a polymerisable alpha-olefinic group linked to a residue which is capable of accepting ion exchange reactive groups.

Suitable alpha-olefinic groups are propenyl, allyl, vinylidene and, particularly, vinyl. Suitable residues are e.g. carboxy-, carboxyl-, acyl halide, reactive halide, and nitrile groups. Thus monomers suitable for grafting and subsequent incorporation of ion exchange reactive groups are acrylic acid, methacrylic acid and their halides and nitriles e.g. acrylonitrile, vinyl and alkyl bromide, acrolein, crotonaldehyde, styrene and substituted styrenes.

The complete graft copolymer of this first type, comprising a nucleus entirely inactive in ion exchange reactions and a shell capable of accepting ion exchange reactive groups, is useful as an intermediate for the preparation of the ion exchange resin.

A second class of monomers useful for grafting on to the polymer nucleus comprises a polymerisable alpha-olefinic group as above defined linked to a functional group, capable of forming reversible bonds, particularly an ion exchange reactive group. Another form of functional groups are chelate forming groups.

Suitable ionic acidic ion exchange reactive groups are those generally used in ion exchange reactions, e.g. sulphonic, phosphonic, phosphinic, thiophosphinic, arsonic and carboxy. Suitable acidic alpha-olefinic monomers are e.g. styrenesulphonic acid, divinylbenzenesulphonic acid, vinylsulphonic acid, acrylic acid and the alkacrylic acids e.g. methacrylic acid; copolymerisable mixtures of these may also be used.

Suitable ionic basic ion exchange groups are also known from the art e.g. primary, secondary or tertiary amino groups, quaternary ammonium, phosphonium and tertiary sulphonium groups; suitable basic alpha-olefinic monomers are then e.g. N-dimethyl or N-diethylvinylamine, vinyl-N-phthalimide, vinylpyridines such as 2- and 4-vinylpyridine, N-vinylpiperidine, N-vinylimidazole, the N-vinyl pyrrolidones, allylamine, propenylamine, allylmono- and di-alkylamines e.g. allylethyamine, allyldiethylamine, dialkylaminoethyl acrylates and alkacrylates e.g. methacrylates, allyldiethanolamine, N-allylmorpholine, N-alkenyl piperidines e.g. N-allylpiperidine, vinylmethylbenzylamine, allyltrialkylammonium chloride.

Metal-complex forming alpha-olefinic monomers suitable for chelating are also known e.g. p-acetamidostyrene, which is graft copolymerised and from which the protecting acid group is then removed by hydrolysis to release the active amino group capable of forming Ni chelates, or derivatives of o-hydroxy carboxylic acids e.g. salicylic acid, o-hydroxy quinones e.g. catechol or o-hydroxyethers e.g. hydroxyacetophenone which may all be made by diazotation of an aminostyrene graft copolymer and subsequent reaction with the o-hydroxy compound and all of which derivatives form heavy metal complexes.

Suitable basic shell graft copolymers of this invention are e.g.

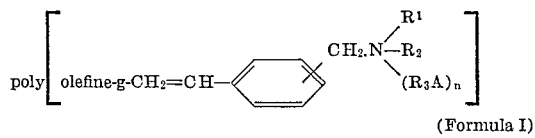

(Formula I)

where $R_1$ and $R_2$, separately, are hydrogen or alkyl and $n=0$ or, whenever $R_1$ and $R_2$ are alkyl, $R_3$ is also alkyl and A is an anion bonded to the quaternary ammonium cation so formed and where, as stated, the polyolefine nucleus is free from basic ion exchange sites.

Certain of our graft copolymers and certain of our graft copolymer intermediates are new compositions of matter; thus for example, as far as we know, the following graft copolymers are new:

poly[olefine-g-(acrolein-co-allylamine)]

(Formula II)

wherein allylamines are

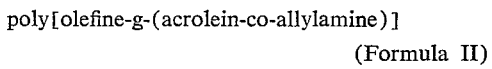

and $R_4$ and $R_5$ separately may be hydrogen or alkyl and $n=0$ or whenever $R_4$ and $R_5$ are alkyl, $R_6$ is also alkyl and A is an anion bonded to the quaternary ammonium cation so formed;

poly[ethylene-g-(acrolein-co-allylamine)];
poly[ethylene-g-(acrolein-co-allylmethylamine)];
poly[ethylene-g-(acrolein-co-allylethylamine)];
poly[ethylene-g-(acrolein-co-allyldimethylamine)];
poly[ethylene-g-(acrolein-co-allyldiethylamine)];
poly[ethylene-g-(acrolein-co-allyl-N-trimethyl quaternary ammonium salts)];
poly[ethylene-g-(acrolein-co-allyl-N-triethyl quaternary ammonium salts)];
poly[olefine-g-allyl-Z]     (Formula III)

where Z is $NR_7R_8$, dialkylallylammonium alkylallylamine salt,

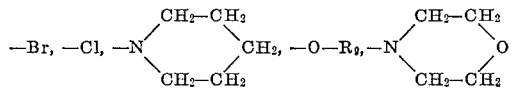

and $R_7$ and $R_8$ separately are alkyl, alkylol or hydrogen and $R_7$ may also be allyl and where $R_9$ is alkyl or halogenated alkyl;

poly[olefine-g-vinyl-Y]     (Formula IV)

wherein Y is

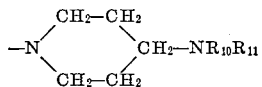

where $R_{10}$ and $R_{11}$ separately are alkyl or alkaryl, —O—$R_{12}$, where $R_{12}$ is alkyl or haloalkyl.

By poly[ethylene-g-acrolein] we mean a copolymer wherein acrolein is grafted on to a nucleus of polyethylene. By poly[ethylene-g-(acrolein-co-allylamine)] for example we mean a copolymer wherein the outer shell of the product is a random copolymer of acrolein and allylamine grafted to a nucleus of polyethylene. Where the polymer of the outer shell has been substituted, as for example with an ethylaminoethyl group, we refer to such a graft copolymer simply as poly[ethylene-g-ethylaminoethyl styrene].

The chain length of the polymeric graft chains is not critical; it can be controlled in a manner known "per se" and both short and long graft chains are useful.

Methods of preparing graft copolymers are known from, for example, British Patent No. 801,528. Our preferred method is to graft-polymerise in the presense of ionising or high energy radiation as understood in the art; this term includes (British Patent No. 801,528, page 1, lines 49–56) beta rays, gamma-rays, neutrons, accelerated electrons and heavy particles, X-rays, etc. or mixtures of them.

Convenient sources for such radiation may be furnished by atomic piles, electron or particle accelerators, radioactive isotopes and X-ray equipment. Graft polymerization techniques are known "per se," e.g. from British Patent No. 876,535 and methods of grafting acrylic or methacrylic acid to polyethylene substrates have been described by J. K. Rieke et al. in J. Polymer Sci., C. 1, 117–133 (1963). In these disclosures the graft reaction was carried out with the polymeric backbone or trunk pre-irradiated, dissolved or swollen in a solvent i.e. comer units penetrated deeply into or were evenly distributed throughout the substrate.

For the purposes of this invention, by contrast, so as to achieve one of its principal objectives, namely a high rate of ion exchange reaction, it is necessary to ensure that the whole of the polymeric nucleus is inert and free from ion exchange reactive groups and that the latter are located entirely in the outer shell, since otherwise reagent gets trapped in the interior of the ion exchange particle and greatly prolonged rates of diffusion of reagent into and from the reactive sites result. The rate of reaction and equilibration is largely determined by the longest diffusion path, since for many purposes and for clean reactions it is desirable that in each cycle a very high proportion of all available sites has been reacted; it is also desirable that the equilibrium capacity is clearly defined and reproducible. Special reaction conditions must therefore be observed.

Accordingly we provide a process which comprises grafting a monomer having a graft-polymerisable $$CH_2=C<$$

group on to an inert polymeric nucleus by contacting nucleus and monomer while irradiating nucleus and liquid monomer simultaneously with a source of high energy, characterised in that the temperature is between 10 and 30° C., the reaction period is from 30–120 minutes, the dose rate is between 3600 rads/hr. and 10 megarad/hr., the liquid reaction medium is excess stabilised monomer, and both the polymer of the nucleus and the formed graft copolymer of the shell are insoluble in and the nucleus is substantially non-swellable by the monomer under reaction conditions.

By substantially non-swellable we mean that the nucleus is not allowed to take up by absorption into its interior more than 1% of non-grafted monomer. If certain monomers have a slight tendency to swell the polymer of the nucleus, swelling can still be controlled within this limit by reducing the temperature and time of exposure. Intensive swelling must be avoided.

Restriction of the grafting to the surface may be attained more effectively by the use of an inert solvent medium or, most preferably, by vapour phase grafting.

Accordingly a preferred process comprises grafting a graft-polymerisable monomer having a group $CH_2=C<$ on to an inert polymeric nucleus, by contacting nucleus and medium while irradiating simultaneously both nucleus and medium with a source of high energy at a temperature from 10 to 30° C. for a period of from ½ to 5 hours, characterised in that the monomer is dissolved in a solvent medium in which both the polymeric nucleus and the grafted-on shell polymer are totally insoluble and in which the nucleus is not swellable. Optionally the nucleus may be cross-linked for greater strength.

Another preferred process comprises grafting a graftcopolymerisable monomer having a $CH_2=C<$ group on to an inert polymeric nucleus by contacting nucleus and monomer vapour while irradiating both nucleus and monomer vapour with a source of high energy at dose rates in excess of 3600 rad/hr. in which process the vapour of said monomer is insoluble in and does not cause swelling of said nucleus.

A particularly preferred form of the latter process comprises suspending the polymeric nuclei in a stream of vapour to form a fluidised bed and vapour phase grafting in the fluidised bed. The fluidising vapours may be the monomer vapour by itself, or an inert gas e.g. nitrogen or a mixture of both.

The comonomers of the shell may optionally be stabilised with known additives. Suitable compounds are set out in Polymer Handbook, J. Brandrup and I. H. Immergut, J. Wiley and Sons, New York, 1966, Chapter II, 71, e.g. substituted hydroquinones, phenols or substituted phenols. The amounts of the additives used are dependent on the nature of the monomer being stabilised; up to 5%, preferably 0.01 to 3%, of the weight of the monomer may be added.

The amount of surface graft may, of course, be controlled e.g. by the total amount of monomer present, the concentration of the monomer present in the diluent if present, duration of the reaction, the total irradiation dose delivered to the system, reaction temperature, and the presence of polymerisation inhibitors. The shell may constitute up to 55% by weight of the shell copolymer (i.e. nucleus plus shell).

Since in our process the polymeric nucleus is insoluble in the monomer or mixture of monomers or the solvent medium, shaped copolymers may be formed in any desired configuration. If, for example, the nucleus is in the form of a sphere, which may have channels running from its outer surface through its interior, or may even be porous, it is possible to graft on to the shaped substrate to form a two-layer article wherein the polymeric graft encloses the nucleus in the form of an extremely even surface envelope.

In preparing copolymers according to our invention by irradiation of a monomer-polymer mixture small quantities of homopolymer may be formed from the monomer which are not grafted to the polymer nucleus. It may therefore be necessary to wash the resultant copolymer free of the unwanted homopolymer. Alternatively and preferably, the formation of homopolymer may be suppressed or reduced by introducing into the mixture to be irradiated homopolymerisation inhibitors.

Accordingly, we provide a process of producing graft copolymers as above defined characterised in that there is added to the mixture a substance capable of reducing the formation of ungrafted homopolymer.

Suitable polymerisation inhibitors are known in the art and may be selected, e.g. from Polymer Handbook, J. Brandrup and I. H. Immergut, J. Wiley and Sons, New York, 1966, chapter II/71.

In general there are two methods of introducing the functional, e.g. an ion-exchange-reactive or a chelating group, into the outer shell. Either the co-mer to be grafted-on bears a functional group, as do e.g. acrylic acid, methacrylic acid, vinylsulphonic acid, vinyl pyridine, allylamine, allyl piperidine or, alternatively, the co-mer is capable of accepting a functional group after the graft-copolymerisation step. As a rule the co-mer must be relatively reactive to permit efficient incorporation of the functional group in the polymeric state. The incorporation in styrene and its homologues of sulphonyl or nitro-groups and conversion of the latter to amino groups, or of chloromethyl groups and conversion of these alkyl-aminomethyl groups is well known and applicable to our copolymers. Similarly certain of our copolymers may be made by graft-copolymerising reactive alpha-olefinic anhydrides e.g. maleic anhydride or, preferably, reactive alpha-olefinic acyl halides e.g. acrylyl chloride, and subsequently reacting the resultant graft copolymer with base-forming groups such as ammonia, amines or hydrolysing the anhydrides or acyl halide groups to form the corresponding acidic derivatives. Yet another technique is to graft-copolymerise an alphaolefine having a protected amino group e.g. acetamidostyrene, and to remove the protecting acid group by hydrolysis and thereby setting the ion exchange reactive amino group free. By suitable choice of polymer and co-mer of the nucleus and shell respectively, all of these methods can be used with the copolymers of this invention while preserving the characteristic of this invention namely the substantial absence of functional e.g. ion-exchange-reactive groups, in the nucleus and a discrete outer shell of the copolymer bearing all functional groups.

In addition to these techniques we have found new processes of converting grafted-on copolymers of acrolein into useful ion-exchange reactive shell copolymers.

The grafting of acrolein to polymethyl methacrylate by gamma irradiation has been described (A. Henglein at al., Makromol. Chem., 31, 181–191 (1959)) using a solution of acrolein in methanol. However, in this method the acrolein penetrates the methacrylate and thus the products are not suitable for the purposes of our invention. Using the process of this invention, surface grafts of polyacroleins and derivatives thereof on inert polymeric substances may be made and suitably modified.

We have found that the mode of graft polymerisation of polyfunctional monomers may be improved by the addition of auxiliary polymerisation catalysts. Acrolein polymerises either by vinyl addition of the double bond leading to a chain containing carbon-carbon bonds, or through the carbonyl portion of the aldehyde group leading to a polyether containing pendant vinyl groups. By using suitable redox catalysts containing ions such as, for example, $Fe^{++} \cdot NO_2^-$ or $S_2O_8^{--}$ or peroxides in a solution of the monomer to be grafted, it is possible to direct the polymerisation so as to favour vinyl addition. Consequently such a graft has a larger number of free aldehyde groups than may be obtained when the graft polymerisation is performed in the absence of such a redox system where a number of the aldehyde groups will be consumed by the formation of a polyether.

Accordingly we provide a process of grafting acrolein onto a polymeric nucleus as above described characterised in that there is added to the mixture a substance capable of forming a redox type catalyst system for the monomer.

Thus for example when polyethylene particles are irradiated in the presence of a water/acetone solution of acrolein containing ferrous ions, the resultant outer layer of acrolein copolymer is substantially a polyaliphatic chain substituted with aldehyde groups with a minimum of ether linkages.

Useful copolymeric acrolein derivatives may be prepared from these polymers by the introduction of amino groups; using the so-called Leuchart-Wallace reaction, the aldehyde groups in the reactive outer shell of the acrolein graft-copolymer may be converted to primary amines by reaction with formic acid and formamide; to secondary amines by reaction with formic acid and primary amines, and to tertiary amines by reaction with formic acid and secondary amines.

Accordingly we also provide a process of grafting a graft-copolymerisable alpha-olefinic aldehyde on to a polymeric nucleus which is insoluble in and substantially non-swellable by the reaction medium which process comprises contacting nucleus and graft co-monomer while irradiating both with a source of high energy in a medium of vapourised monomer or a solution of monomer in an organic or aqueous-organic liquid and then reacting the free aldehydic groups of the resultant copolymeric outer shell with formic acid and formamide, a primary amine or a secondary amine, thereby converting at least a substantial proportion of said aldehydic groups into the corresponding primary, secondary or tertiary amino groups.

The reaction of (monomeric) aldehyde with formic acid and formamide, a primary amine or a secondary amine leading to the amine analogue of the aldehyde, the so-called Leuchart-Wallace reaction, is known (see Houben-Weyl, "Methoden der Organischen Chemie," 4th ed. E. Muller, Vol. XI/1. page 648 and following or M. L. Moore, "Organic Reactions" 5, 301 (1949)).

The processes according to our invention are usually carried out at room temperature and atmospheric pressure. However, at high dilutions of monomer, e.g. in the vapour phase reaction, higher temperatures and pressures may be used when the polymer of the nucleus is sufficiently inert.

Our copolymers are useful as resins in ion exchange processes. They have excellent adhesion of the outer copolymer shell to the inner core; this is of great importance in technical use. It increases the length of their active life insofar as the particles are less prone to disintegrate, powder or become misshapen when used for example in a fluidised bed.

As already emphasized, the rate of ion exchange processes is diffusion controlled. This in turn is controlled by several factors including for example the nature and type of the ion exchange material, its shape and structure, its particle size, the degree to which it is cross-linked, and the temperature at which the ion exchange process is operated and, particularly, the length of the diffusion path to the reactive sites. In respect of the latter the longest paths are rate-controlling. It is therefore desirable to have as short a diffusion path within the ion exchange medium and as uniform path lengths as possible. The copolymers according to our invention which have an inert organic polymeric substrate surrounded by a reactive non-crosslinked polymeric shell of even thickness have diffusion paths considerably smaller than the known polymeric ion exchange media.

Accordingly we also provide an improved ion exchange process comprising reacting an acidic or basic ion exchange resin according to this invention with a counter-ion.

To ensure that ion exchange media of the polymeric type are sufficiently insoluble in electrolytes and of sufficient physical strength to withstand physical breakdown or malformation, prior art polymers require a considerable degree of cross-linking. This is a disadvantage, since the rate of ion exchange is inversely related to the degree of cross-linking of the ion exchange medium. Copolymers according to our invention in which the outer reactive polymer is chemically bonded to the inert nucleus have shown improved, satisfactory resistance to attrition and physical breakdown without the need for cross-linking. Even when yet a further increase in strength by some cross-linking is desirable, the degree of cross-linking necessary is substantially lower than that required in similar or corresponding prior art ion exchange media. Consequently our copolymers exhibit improved rates of diffusion and ion exchange in contact with electrolytes, and improved rates of regeneration after they have become exhausted in use.

By a suitable combination of the inert nucleus and the reactive polymeric shell ion exchange media or stripping agents may be prepared. Thus weakly acidic cationic ion exchange media may be obtained from poly(acrylic acid) or poly(methacrylic acid) shells. Weakly basic anionic ion exchange media may be prepared for example from poly(diethylaminoethyl methacrylate), poly(aminostyrene), poly(ethylaminomethylstyrene), poly(diethylaminomethylstyrene), poly(aminopropylenestyrene), poly(acrolein-co-allylamine), poly(acrolein-co-allyldiethylamine), poly(dimethylaminoethyl methacrylate) or poly(isoaminobutene) shells. Similarly strongly acidic cation ion exchange media may be prepared from shells having acidic residues e.g. sulphonic, phosphonic, phosphinic, thiophosphonic and arsonic acid residues. Strongly basic ion exchange resins may be prepared from shells comprising quaternary ammonium, quaternary phosphonium or tertiary sulphonium groups.

As already stated, our copolymers materials have the advantages of fast and efficient film diffusion, rapid and reproducible rate of equilibration, firm anchorage of the outer shell without cross-linking or with reduced cross-linking and symmetry of the particle and shell. Other advantages are that the particle size of the copolymer and the thickness of the outer shell may be controlled to give optimum flow rates of electrolytes for a given set of conditions and that damage to particles due to swelling and de-swelling during ion exchange process cycles is minimised owing to the inert nature of the nucleus.

Our graft copolymers are particularly suitable for use as ion exchange media in continuous countercurrent adsorption ion exchange processes such as, for example, the so-called "Sirotherm" process.[1] Our copolymers may also be used for the transformation of electrolytes in water softening; for the removal of ionic constituents from solutions by means of a combination of an anion exchange and cation exchange resin; for the fractionation of ionic substances, for example by gas-solid or liquid-solid chromatography or for the concentration of ionic substances. They also have applications in pharmacy, particularly in the separation or purification of amino acids, antibiotics, vitamins or hormones. Further uses are in the agricultural field for example the treatment of sugar-containing plants and purification of their products. They have utility in the recovery of organic acids such as citric, ascorbic or tartaric acids from food wastes. They are also effective as catalysts in chemical reactions and may be used to prepare colloids.

Besides being useful in their particulate form, our copolymers may also be shaped or fabricated into articles. They may, for example, be joined into networks of particles such as foams.

Our invention is now illustrated by, but not limited to, the following examples.

EXAMPLES 1 TO 3 INCLUSIVE

Spherical polyethylene powder particles and having a density of 0.924 and a melt flow index of 2 was sieved. That portion of the powder which passed a 36 mesh BSS sieve but was retained on a 52 mesh BSS sieve was recovered and used in these examples. Into a 500 ml. two neck Pyrex Quickfit flask provided with a thermometer and a stopper with a tap was added the sieved polyethylene powder together with monomer and solvent as set out in Table I and the contents of the flask were mixed. The flask containing the mixture was degassed three times to 0.005 mm. Hg using liquid nitrogen as the coolant. The flask and its contents were then irradiated with Cobalt 60 gamma rays from a 2000 curies Cobalt 60 source at a dose rate of $1.95 \times 10^5$ rads per hour. Details of the irradiation are set out in Table I. The dose rate was determined by ferrous sulphate dosimetry as described by Battaerd et al. in Reviews of Pure and App. Chem. 16, p. 83 (1966) with $G_{Fe^{++}}=15.6$. The dosimetry was performed in the same apparatus as was used in the examples, occupying the same volume as the reaction mixture. The dose rate to the reaction was not corrected for electron density and was recorded as delivered to the dosimetry solutions. The irradiated samples were washed with a solvent for the homopolymer of the grafted chain. The washed samples were then transferred to a Soxhlet apparatus and extracted for 48 hours with a solvent for the homopolymer until all the extractable homopolymer had been eliminated from the irradiated product. The resultant product was then dried in vacuo at about 60° C. for 18 hours. The degree of grafting achieved was measured by the increase in weight of the original polyethylene. The presence of the desired grafted polymer in the product was confirmed by infra-red spectroscopy. Microscopic examination of the product showed the presence of a substantially symmetrical layer of a polymer completely surrounding the polyethylene particle. The thickness of the surrounding shell layer was of the order of 10 to 50 microns. There were thus obtained copoly- ---
[1] Described in Australian patent applications Nos. 28,189/63, 35,891/63 and 59,441/65.

mers in shaped form in which a reactive polymer formed a shell around an inert polymeric substrate. The weight of the copolymeric shell formed expressed as percent of the total weight of the particle is given as "percent graft."

TABLE I.—EXAMPLES 1–3 INCLUSIVE

| Example No. | Type of powder | Quantity of powder, g. | Type of monomer | Quantity of monomer, ml. | Type of solvent | Quantity of solvent, ml. | Temp. of irradiation, °C. | Total irradiation dose, megarad | Graft percent |
|---|---|---|---|---|---|---|---|---|---|
| 1 | Polyethylene | 100 | Acrylic acid | 150 | Methanol | 450 | 30 | 0.6 | 13 |
| 2 | do | 100 | Methacrylic acid | 100 | do | 300 | 30 | 0.6 | 16 |
| 3 | do | 100 | Dimethylamino ethyl methacrylate | 12.5 | do | 50 | 30 | 0.7 | 10.5 |

EXAMPLE 4

Using the equipment, reaction conditions and polyethylene particles described in Examples 1 to 3, styrene monomer stabilised with 0.1% of its weight of tertiary butyl catechol was grafted to polyethylene. The resultant product so obtained was washed with successive portions of benzene at room temperature until no homopolymer was detected in the wash liquid, washed further with methanol and dried for 18 hours under vacuum at 50° C. The degree of grafting achieved, 21.2%, was measured by the increase in weight of the original polyethylene. Details of the example are set out in Table II. The presence of grafted polystyrene in the product was confirmed by infrared spectroscopy. Microscopic examination of the product showed the presence of a substantially symmetrical layer of polystyrene surrounding the polyethylene particle. It was noted that only small amounts of homopolymer were formed during the grafting process and this is attributed to the use of a stabilised styrene monomer. There was thus obtained a copolymer of polyethylene and polystyrene in shaped form in which the polystyrene surrounded the polyethylene nucleus in the form of a shell and useful as an intermediate in the preparation of ion exchange media.

EXAMPLE 5

Example 4 was repeated, but the stabilised styrene monomer was replaced by 19.5 ml. of acrolein stabilised with 0.1% of its weight of hydroquinone. The stabilised acrolein was dissolved in a 3:1 water/acetone mixture to form a 13% v./v. solution of acrolein and 3 g. of $FeSO_4 6H_2O$ was also added to this solution. Details of this example are set out in Table II. There was thus obtained a graft copolymer of polyacrolein on polyethylene, containing 9% of polyacrolein, in shaped form in which the polyacrolein surrounded the polyethylene in the form of a substantially symmetrical shell as confirmed by microscopic examination of the product. The degree of grafting of polyacrolein was measured by the increase in weight of the original polyethylene and its presence in the product was confirmed by infra-red spectroscopy. This graft copolymer was useful as an intermediate in the preparation of ion exchange media.

EXAMPLE 6

Example 5 was repeated but the hydroquinone was omitted. A copolymer similar to that of Example 5, but containing 14% of polyacrolein, was obtained. Details of this example are set out in Table II.

EXAMPLE 7

50 g. of the shaped copolymer obtained in Example 4 was treated in the manner described in Examples 3 and 5 of our copending Australian patent application No. 4,671/66 to form poly(ethylene-g-amino styrene). The resultant product, 51.5 g., equivalent to a polyamino styrene content of 24% was in shaped form and microscopic examination of it showed that the polyamino styrene surrounded the polyethylene nucleus in the form of a substantially symmetrical spherical shell. The presence of aromatic amino groups in the graft copolymer was confirmed by infra-red spectroscopy.

EXAMPLE 8

50 g. of the shaped copolymer obtained in Example 4 was placed in a glass reaction vessel fitted with a stirrer and reflux condenser. 50 ml. of chloromethyl methyl ether, 50 ml., of dioxan and 5 ml. of tin tetrachloride were then added to the vessel and the mixture heated to reflux temperature for 6 hours. The mixture was cooled; the particles were filtered from the mother liquor, washed with methanol and dried under vacuum at 50° C. The resultant product, 54.5 g., was shown to be poly(ethylene-g-chloromethylstyrene) by infra-red spectroscopy. To 10 g. of the poly(ethylene-g-chloromethylstyrene) so obtained was added an excess of ethylamine and the mixture was heated at reflux temperature on a water bath for 7 days. The resultant particles were filtered from the mixture, washed with methanol and dried for 18 hours at 50° C. under vacuum. There were thus obtained small beads of graft copolymer of polyethylene and polyethylaminomethylstyrene. The presence of secondary amino groups was confirmed by chemical analysis and infra-red spectroscopy.

EXAMPLE 9

Example 8 was repeated but the ethylamine was replaced by diethylamine. There was thus obtained a graft copolymer, poly(ethylene-g-diethylaminomethylstyrene), in shaped form.

EXAMPLE 10

10 g. of the poly(ethylene-g-chloromethylstyrene) obtained in Example 8 in the form of two-layered spherical particles was treated using reaction conditions as described in Example 19 of our copending Australian patent application No. 4671/66 to form two-layered spherically shaped particles of polyethylene with a substantially symmetrical shell of a mixture of poly(ethylaminomethylstyrene) and poly(aminopropylstyrene).

EXAMPLE 11

50 g. of the poly(ethylene-g-styrene) obtained in Example 4 was treated with an excess of concentrated sul-

TABLE II.—EXAMPLES 4–6 INCLUSIVE

| Ex. No. | Type and quantity of powder, g. | Type and quantity of monomer, ml. | Type and quantity of solvent, ml. | Type and quantity of stabilizer, g. | Temp. of irradiation, °C. | Total irradiation dose, megarad | Graft percent |
|---|---|---|---|---|---|---|---|
| 4 | Polyethylene, 100 | Styrene, 150 | None | Tertiary butyl catechol, 0.15 | 10 | 0.4 | 21.2 |
| 5 | do | Acrolein, 19.5 | 3/1 water-acetone mixture,[1] 130.5 | Hydroquinone, 0.15 | 30 | 2.4 | 9 |
| 6 | do | do | do [1] | None | 30 | 2.4 | 14 |

[1] In Examples 5 and 6, 3 g. of $FeSO_4.6H_2O$ were added to the solvent.

phuric acid at 100° C. using the method described by K. W. Peffer, J. Appl. Chem. 1, 124 (1951) to form a shaped copolymer weighing 58 g. in which the polyethylene nucleus was surrounded by a thin shell of polystyrene containing as substituents sulphonic acid groups. The presence of sulphonic acid groups was confirmed by infrared spectroscopy.

EXAMPLE 12

100 g. of the poly(ethylene-g-acrolein) coplymer in the form of two layered spherical particles obtained in Example 6 was placed in a 500 ml. three-necked Pyrex glass flask fitted with a condenser, stirrer and thermometer. 30 g. of formamide, 37 g. of 90% formic acid and 200 ml. of nitrobenzene were added to the flask and the mixture was heated with stirring at reflux temperature for 24 hours. The mixture was cooled to room temperature and the spherical particles were separated by filtration, washed with methanol and dried for 18 hours under vacuum at 50° C. There was thus obtained 98.2 g. of a graft copolymer of polyethylene to which was grafted in the form of a shell surrounding the inert polyethylene nucleus, polyacrolein which had been partially converted to an aliphatic primary amine form, poly-(acrolein-co-allylamine). The presence of primary amino groups in the copolymer was confirmed by infra-red spectroscopy and the substantially symmetrical shape of the thin shell surrounding the polyethylene nucleus was confirmed by microscopic examination of the particles.

EXAMPLE 13

Example 12 was repeated but the formamide was replaced by ethylamine. There was thus obtained a great copolymer containing as the outer reactive shell poly-(acrolein-co-allylethylamine).

EXAMPLE 14

Example 12 was repeated but the formamide was replaced by diethylamine. There was thus obtained a graft copolymer containing poly(acrolein-co-allyldiethylamine) in the outer shell.

EXAMPLE 15

This example demonstrates a method of cross-linking a polymer suitable for use as an inert nucleus, thereby increasing its physical strength, prior to grafting to form a copolymer.

(a) 200 g. of a polyethylene as used in Examples 1 to 3 was soaked in an excess of a 54% divinyl benzene solution in ethyl vinyl benzene for 2 hours. The spherical particles were then separated from the solution by centrifugation, centrifuged until free of adherent liquid, placed in a glass tubular reactor of internal diameter 2″ and length 16″ and supported on a sintered glass disc to form a bed. The bed so formed was fluidised by nitrogen saturated with a divinyl benzene/ethyl vinyl benzene mixture, the nitrogen having been passed at room temperature through wash bottles containing the corresponding liquids prior to entering the bed. The fluidised bed was then irradiated with Cobalt 60 gamma rays from a source as described in Examples 1 to 3 at a dose rate of $2 \times 10^5$ rads/hr. as determined by ferrous sulphate dosimetry. Irradiation was continued for 5 hours to give a total nominal irradiation dose of 1 megarad. The resultant product was dried for 18 hours under vacuum at 65° C. It is insoluble in boiling decalin which deminstrates strong cross-linking. Determination of the amount of insoluble material and examination by infrared spectroscopy showed that the product contained 7% of divinyl benzene and an equivalent amount of ethyl vinyl benzene. 200 g. of the cross-linked polyethylene were placed in the reactor described above and the bed so formed was fluidised with nitrogen saturated with acrylic acid vapour at 30° C. and irradiated at 35° C. with Cobalt 60 gamma rays from a source as described in Examples 1 to 3 at a dose rate of $2 \times 10^5$ rads/hr.

The irradiation was continued for 12 hours until a weight increase of 62 g. of the contents of the bed was obtained. The product so obtained was extracted with hot methanol in a Soxhlet apparatus for 48 hours, and then dried under vacuum at 65° C. until constant in weight. The final weight of the purified product, 261.3 g., was equivalent to a graft of polyacrylic acid of 30.6%, the weight loss as a result of purification, 0.7 g., corresponding to the removal of the small amount of homopolymer formed during the reaction.

(b) For comparative purposes a copolymer was prepared by the same method except that the polyethylene was not cross-linked prior to grafting with acrylic acid. A copolymer having an outer shell similar to that obtained in the earlier part of the example was obtained.

EXAMPLE 16

Example 15(b) was repeated but the spherical polyethylene particles having a density 0.924 were replaced by spherical particles comprised of polyethylene as used in Examples 1 to 3 in which had been incorporated by known means 12% of the weight of polyethylene of colloidal silica. The particles so prepared had a density of 1.13. There was thus obtained a copolymer bead having a spherical shell of polyacrylic acid surrounding an inert nucleus of polyethylene which contained silica as an inert filler. The graft copolymer contained 30% of polyacrylic acid.

EXAMPLES 17 TO 18 INCLUSIVE

Using the spherical polyethylene particles and apparatus of Example 1, and diethylaminoethyl methacrylate dissolved in methanol, copolymers of poly(ethylene-g-diethylaminoethyl methacrylate) were prepared. Details of the examples are set out below:

| | Example 17 | Example 18 |
|---|---|---|
| Weight of polyethylene, g | 100 | 100 |
| Diethylaminoethyl methacrylate, ml | 12 | 24 |
| Methanol, ml | 36 | 36 |
| Radiation dose, rads | $0.45 \times 10^5$ | $0.55 \times 10^5$ |
| Percent graft (by weight of total particle) | 6.9 | 14.0 |

There were thus obtained graft copolymers of polyethylene and polydiethylaminoethyl methacrylate having different degrees of grafting in the polydiethylaminoethyl methacrylate in the layer surrounding the polyethylene substrate. The degree of grafting in the copolymer was confirmed by the change in weight of the product in comparison with the weight of the original polyethylene; the nature of the outer shell was confirmed by infrared spectroscopy and the shape of the two-layered particle was determined by microscopy.

EXAMPLE 19

Example 1 was repeated except that 75 ml. of acrylic acid and 325 ml. of methanol were used. The total irradiation dose was 0.64 megarad. A product similar to that of Example 1 containing 9.7% of grafted polyacrylic acid was obtained.

EXAMPLE 20

Example 19 was repeated but the total irradiation dose was 0.32 megarad. A product similar to that of Example 19 containing 6.8% of grafted polyacrylic acid was obtained.

EXAMPLE 21

This example describes the preparation of a graft copolymer in which the inert nucleus was polyethylene of the same type and particle size as used in Example 1 but was comprised of irregularly shaped particles. Using the apparatus and method of Example 1, a mixture of 100 g. of polyethylene and 50 ml. of acrylic acid dissolved in 150 ml. of methanol and a total irradiation dose of 0.4 megarad, poly(ethylene-g-acrylic acid) was prepared. The product containing 14.2% of polyacrylic acid in the form of a shell was used as an ion exchange resin in Example 45.

EXAMPLE 22

150 g. of spherical particles formed from polyethylene and containing 16.6% $TiO_2$ and passing a 22 mesh BSS sieve but being retained on a 36 mesh BSS sieve were placed into the apparatus described in Example 15. The particles were fluidised with nitrogen which was saturated with acrylonitrile at 29° C. The contents of the apparatus were maintained at a temperature of 31° C. and irradiated from a Cobalt 60 source during fluidisation until a total dose of 0.59 megarad was delivered. At the conclusion of the irradiation the particles were washed with dimethylformamide until free of homopolymers, dried and weighed. The weight increase of the particles was 5.3%. 60 g. of the poly(ethylene-g-acrylonitrile) so produced was reduced to the corresponding amine by reacting it with lithium aluminium hydride in tetrahydrofuran at 65° C. for 44 hours. The particles were separated by filtration, washed firstly with hydrochloric acid and then with water and dried in vacuo at 60° C. When used as an ion exchange resin the particles had a capacity of 0.18 m. eq./g.

60 g. of the poly(ethylene-g-acrylonitrile) beads were treated with 2% aqueous hydrazine for 8 hours, filtered and heated to 130° C. for 4 hours. The beads so formed are a chelating agent for copper.

The beads were shaken for 18 hours with a 2% copper sulphate solution, washed and dried. On microscopic examination a sharp blue shell could be observed of 3–4 micron on a 500 micron bead.

EXAMPLE 23

Example 3 was repeated but the spherical polyethylene particles were replaced by particles of polytetrafluoroethylene available under the Registered Trade Mark of "Fluon" G4, and the total irradiation dose was 0.5 megarad. The separated particulate product was washed with methanol and then extracted with hot methanol for 48 hours in a Soxhlet apparatus. The resultant copolymer, poly(tetrafluoroethylene-g-dimethylaminoethyl methacrylate), was shown by microscopy to be in the form of a shell of polydimethylaminoethyl methacrylate surrounding the polytetrafluoroethylene substrate. The chemical nature of the graft copolymer was confirmed by infra-red spectroscopy and the degree of grafting, 6.9%, was determined from the increase in weight of the product in comparison with the weight of the original polytetrafluoroethylene.

EXAMPLE 24

Using the apparatus described in Example 1 and the method and polytetrafluoroethylene described in Example 23, 100 g. of polytetrafluoroethylene mixed with 20 g. of distilled acrylic acid and 45 ml. of methanol was converted to poly(tetrafluoroethylene-g-acrylic acid) containing a 9% graft of acrylic acid in the form of a shell surrounding the polytetrafluoroethylene substrate.

EXAMPLE 25

200 g. of polyethylene as used in Example 15 was soaked in an excess of a 54% v./v. solution of divinyl benzene in ethyl vinyl benzene for 8 hours. The particles were freed from excess liquid by centrifugation, placed in a reactor as described in Example 15 and fluidised with $N_2$ saturated at room temperature with divinyl benzene and ethyl vinyl benzene. The mixture was irradiated in the fluidised state as described in Example 15 to a total dose of 2 megarad. The sample after drying under vacuum at 50° C. to constant weight showed a weight increase of 22%, corresponding to 11% cross-linking with divinyl benzene.

The sample was then replaced in the reactor and fluidised with butadiene. The reactor and the fluidised bed of cross-linked polyethylene particles were then irradiated at a dose rate of 0.2 megarad per hour, for 12 hours. The product after vacuum drying for 24 hours at 50° C. showed a weight increase of 25% over the original weight of cross-linked polyethylene equivalent to a 20% graft of polybutadiene. 100 g. of the poly(ethylene-g-butadiene) so prepared was mixed in a stirred autoclave with 5 g. of freshly cut sodium and 51 g. of liquid ammonia. The temperature of the autoclave was then raised to about 80–100° C. so that it was pressurised to about 2000 lb./sq. in. and this pressure was maintained for 20 hours. At the end of this time, the autoclave pressure was reduced to atmospheric pressure, the resultant particles were removed and washed with water and dried under vacuum for 24 hours at 50° C. The resultant poly-(ethylene-g-isoamino butene) was shown by microscopy to be in the form of a two-layered particle having an outer layer of polyisoamino butene surrounding the cross-linked polyethylene nucleus. The presence of primary aliphatic amine in the graft copolymer was confirmed by infra-red spectroscopy.

EXAMPLE 26

100 g. of polystyrene cross-linked with 10% divinyl benzene prepared by known methods and in the form of spherical particles passing a 36 mesh BSS sieve and retained on a 52 mesh sieve, was mixed with 50 ml. of distilled acrylic acid and 150 ml. of methanol. Using the apparatus and methods of Example 1 the mixture was irradiated to a total dose of 0.5 megarad. The resultant particles were separated by filtration, washed with methanol, extracted in a Soxhlet apparatus for 48 hours with hot methanol and dried for 18 hours under vacuum at 50° C. The weight increase of the original polystyrene was 15%. Microscopic examination and infra-red spectroscopy confirmed that the poly(styrene-g-acrylic acid) so obtained was in the form of a shell of polyacrylic acid surrounding the polystyrene nucleus.

EXAMPLES 27 TO 55 INCLUSIVE

Certain of the graft copolymers prepared in the previously described examples were used as ion exchange resins. So that the efficacy of the graft copolymers as ion exchange resins could be determined, each suitable copolymer was subjected to two complete absorption-regeneration cycles, the equilibrium capacity of each copolymer was determined and the time for each copolymer to come to equilibrium with an electrolyte was ascertained. The results of these determinations, performed as described below, are set out in Table III together with references to the origin of the graft copolymer, the nature of the graft copolymer and the type of ion exchange media which it represents.

Copolymers according to our invention were prepared for use as ion exchange media as follows. Where the copolymer was considered to be suitable as an acid exchange medium a known weight of the copolymer was treated with an excess of aqueous 0.06 N HCl and 0.03 N NaCl for 24 hours with agitation. The treated copolymer was then separated from the solution by filtration, washed with carbon dioxide-free distilled water till free of chloride ions and separated from the wash liquor and then treated with an excess of 0.03 N NaCl for 24 hours and again separated and washed as described above until free of chloride. This cycle was repeated once more and in addition the copolymer was treated with an excess of 0.05 N HCl and 0.03 N NaCl to convert it to the acid form. The copolymer in its acid form was placed in a laboratory ion exchange column and washed for three weeks with carbon dioxide-free distilled water, the rate of washing being 3 ml. of water per minute for every 100 g. of dry copolymer.

For copolymers suitable as base exchange media, a similar method was adopted but the 0.05 N HCl was replaced by 0.05 N NaOH to convert the copolymer to the base form. The equilibrium capacity of the treated copolymers, expressed as milliequivalents of exchanged ion per gram of dry copolymer (m.eq./g.), was determined by the method described by F. Helfferich, "Ion Exchange," McGraw Hill Book Co., 1962, p. 91. The time required for the treated copolymers to attain different specified proportions of their equilibrium capacity and the ion exchange values of the copolymers were determined by the methods described by D. E. Weiss et al., Aust. J. Chem. 19, 589–608 and 561–587 (1966).

The results of Examples 27 to 51 are set out in Table III.

cal strength of the copolymer as a result of using a cross-linked nucleus.

EXAMPLE 53

The copolymers prepared in Examples 17 and 18 were used as ion exchange media. From Table III, Examples 40 and 41, and the data tabulated in Examples 17 and 18 it will be seen that their equilibrium capacities are related to the degree of grafting and that of Example 18 is twice

TABLE III.—EXAMPLES 27–51

| Example No. | Copolymer Prepared in Example | Insert substrate | Reactive outer shell | Ion exchange type | Equilibrium capacity, m.eq./g. | Time to reach indicated proportion of equilibrium capacity |
|---|---|---|---|---|---|---|
| 27 | 1 | Polyethylene | Poly(acrylic acid) | Weak acid cation | 2.36 | 80% in 10 mins. 90% in 60 mins. |
| 28 | 2 | do | Poly(methacrylic acid) | do | 2.78 | |
| 29 | 3 | do | Poly(diethylaminoethyl methacrylate). | Weak base anion | 0.55 | |
| 30 | 7 | do | Poly(paraamino styrene) | do | 1.5 | 49% in 5 mins. |
| 31 | 8 | do | Poly(ethylaminomethyl styrene). | do | 1.2 | 61% in 5 mins. |
| 32 | 9 | do | Poly(diethylaminomethyl styrene). | do | 1.2 | 53% in 5 mins. |
| 33 | 10 | do | Mixture of poly(ethylaminomethyl styrene) and poly(aminopropyl sytrene). | do | 2.01 | 71% in 5 mins. |
| 34 | 11 | do | Polystyrene containing sulphonic acid groups. | Strong acidic cation | 1.1 | 90% in 5 mins. |
| 35 | 12 | do | Poly(acrolein-co-allyl amine) | Weak base anion | 1.6 | 85% in 2 mins. |
| 36 | 13 | do | Poly(acrolin-co-allyl-ethyl amine) | do | 1.4 | 85% in 7 mins. |
| 37 | 14 | do | Poly(acrolein-co-allyl-diethyl amine). | do | 1.21 | 85% in 4 mins. |
| 38 | 15 | Polyethylene cross-linked with divinyl benzene. | Poly(acrylic acid) | Weak acid cation | 3.8 | 85% in 12 mins. |
| 39 | 16 | Polyethylene mixed with silica | do | do | 3.8 | Do. |
| 40 | 17 | Polyethylene | Poly(diethylaminoethyl methacrylate). | Weak base anion | 0.68 | 90% in 10 mins. |
| 41 | 18 | do | do | do | 1.35 | 60% in 10 mins. |
| 42 | 19 | do | Poly(acrylic acid) | Weak acid cation | 2.3 | 70% in 5 mins. 80% in 30 mins. 80% in 60 mins. |
| 43 | 20 | do | do | do | 1.0 | 60% in 5 mins. 80% in 30 mins. 85% in 60 mins. |
| 44 | | Commercially available Amberlite IRC 84 | | do | 9.48 | 25% in 5 mins. 60% in 30 mins. 80% in 60 mins. |
| 45 | 21 | Polyethylene irregularly shaped particles. | Poly(acrylic acid) | do | 2.1 | 71% in 5 mins. 85% in 12 mins. |
| 46 | 22 | Polyethylene | Poly(allylamine) | Weak base anion | 0.18 | |
| 47 | | Commercially available "Zeo-Karb" 226 | | Weak acid cation | 9.8 | 22% in 5 mins. 40% in 10 mins. 65% in 30 mins. 85% in 60 mins. |
| 48 | 23 | Polytetrafluoroethylene | Poly(dimethylaminoethyl methacrylate). | Weak base anion | 0.4 | |
| 49 | 24 | do | Poly(acrylic acid) | Weak acid cation | 1.2 | |
| 50 | 25 | Polyethylene cross-linked with divinyl benzene. | Poly(isoamino butene) | Weak base anion | 2.2 | |
| 51 | 26 | Polystyrene cross-linked with divinyl benzene. | Poly(acrylic acid) | Weak acid cation | 2.86 | |

EXAMPLE 52

The copolymers prepared in Example 15 were used as ion exchange media wherein the copolymers were subjected to continuous cycling of an ion exchange process. It was found after 2000 repetitive cycles that the copolymer (15b) in which the polyethylene had not been cross-linked showed evidence of cracking and physical breakdown of the nucleus. The copolymer (15a) containing the cross-linked polyethylene nucleus showed no evidence of physical change after 3000 repetitive cycles. This example demonstrates the improvement obtained in physithat of Example 17. The time to come close to a practically acceptable target near equilibrium conditions, say, 90% of the equilibrium capacity for Example 40 and 60% for Example 41, was the same for each copolymer.

EXAMPLE 54

From the data tabulated in Table III, Examples 42, 43 and 44, a comparison of the time taken to achieve specified degrees of equilibrium was made. The comparison showed that the copolymers of our invention had a faster uptake of ions than did the commercially available ion exchange resin "Amberlite" IRC 84 (registered trade mark). This characteristic of our copolymers made them more suitable than "Amberlite" IRC 84 for use in continuous countercurrent adsorption ion exchange processes.

EXAMPLE 55

Using the method described by D. E. Conway et al., Trans Faraday Society, 50, 511, 1954, the diffusion characteristics of copolymers of Examples 1, 19, 20 and 21 when used as ion exchange resins and a commercially available carboxylic ion exchange resin "Zeo-Karb" 226 were determined. Using their formula $B = \pi^2 D / r^2$ where B is a measure of diffusion rate;
D is the effective diffusion coefficient for sodium or hydrogen ion;
r is the radius of the particle;

values for $B \times t$ were determined where $t$ is time.
The results are set out in Table IV.

TABLE IV.—VALUES OF B×t

| Time, minutes: | Copolymer from Example No. | | | | "Zeo-Karb" 226 |
|---|---|---|---|---|---|
| | 1 | 19 | 20 | 21 | |
| 2 | 0.18 | 0.4 | 0.20 | 0.20 | |
| 5 | 0.70 | 0.54 | 0.52 | 0.52 | 0.10 |
| 10 | 0.96 | 0.82 | 0.90 | 0.86 | 0.20 |
| 15 | 1.22 | 1.02 | 1.02 | 1.00 | 0.36 |
| 30 | 1.60 | 1.30 | 1.38 | 1.08 | 0.80 |
| 60 | 2.10 | 1.42 | 1.80 | 1.20 | 1.52 |

If the values in Table IV for $B \times t$ are graphed against $t$ it is found that the resultant curves are non-linear for the copolymers prepared in Examples 1, 19 and 20 and are linear for the commercially available ion exchange resin "Zeo-Karb" 226. This part of the example demonstrates that the spherical copolymers of Examples 1, 19 and 20 have film diffusion characteristics, whilst "Zeo-Karb" 226 shows particle diffusion characteristics. In the case of copolymer prepared in Example 21 the graph of the values for $B \times t$ against $t$ is at first non-linear and then becomes linear, showing that this copolymer initially exhibited film diffusion characteristics and then exhibited particle diffusion characteristics.

This example demonstrates that both spherically shaped and irregularly shaped particles from copolymers of our invention have improved diffusion characteristics over those of "Zeo-Karb" 226. It also demonstrates that, of our copolymers, those having a spherical particulate configuration have better diffusion characteristics than those having an irregular shape.

EXAMPLES 56 TO 63 INCLUSIVE

These examples demonstrate the preparation of cross-linked polyethylene particles, some of which contain an inorganic filler, which are useful as nuclei in the manufacture of our copolymers. The polyethylene particles (S.G. 0.921, melt flow index 7) consisted of two general types: (a) spherical particles without filler and (b) with titanium dioxide filler. Each type was subdivided into sieve fractions as indicated in Table V. 400 g. of particles from each example were charged into an apparatus consisting of a glass cylinder, 10 cm. in diameter, 20 cm. long, fitted at the top with a Quickfit FG 100 flange and three-necked lid, and provided at the bottom with a support comprised of a coarse (No. 1 frit) 10 cm. sintered glass disc to which a tap was attached. The particles were covered with commercial divinylbenzene containing 54% divinylbenzene, 42% ethylvinylbenzene and 4% ethyl benzene. The apparatus and contents were maintained at a temperature of 25° C. After 24 hours the nonadsorbed divinylbenzene was removed by suction and the apparatus and contents were surrounded by 8 sources of Cobalt 60 each of 250 curies and irradiated until the nominal dose set out in Table V was delivered. During irradiation the contents of the apparatus were fluidised with nitrogen saturated at the irradiation temperature with divinylbenzene vapour. After grafting the irradiated particles were washed with benzene until they were free of homopolymer, washed further with methanol and dried under vacuum at 60° C. The degree of cross-linking obtained, as calculated from the increase in weight of the original particles is set out in Table V. There were thus obtained cross-linked polyethylene particles suitable for use in the preparation of graft copolymers.

TABLE V.—CROSS-LINKING OF POLYETHYLENE PARTICLES USING DIVINYLBENZENE

| Example No. | Particle Fraction Classified on B.S.S. Sieve | | Filler | Irradiation dose, megarad | Degree of cross-linking expressed as percent divinylbenzene in product |
|---|---|---|---|---|---|
| | Passed mesh number | Retained on mesh number | | | |
| 56 | 22 | 36 | Nil | 2.2 | 5.7 |
| 57 | 22 | 36 | Nil | 1.6 | 5.1 |
| 58 | 52 | 100 | Nil | 2.2 | 6.1 |
| 59 | 52 | 100 | Nil | 2.6 | 8.4 |
| 60 | 22 | 36 | 16.6% w./w. of TiO$_2$ | 1.9 | 7.6 |
| 61 | 36 | 52 | do | 5.1 | 11.5 |
| 62 | 52 | 100 | do | 1.8 | 5.0 |
| 63 | 52 | 100 | do | 2.2 | 5.5 |

EXAMPLES 64 TO 87 INCLUSIVE

These examples demonstrate the vapour phase graft polymerisation of acrylic acid onto a nucleus of polyethylene. The nuclei were spherical polyethylene particles having a density of 0.921 gm./cc. and a melt flow index of 7. The details of the particles used are set out in Table VI.

The tabulated weights of particles were charged into the same apparatus as used in Examples 56–63. The particles in the reactor were fluidised with oxygen free nitrogen saturated with acrylic acid vapour. The fluidising medium was prepared by bubbling nitrogen through acrylic acid held in thermostatted bubblers and then passing the vapour mixture through a chemically inert thermostatted liquid trap. The temperature of the contents of the reactor was maintained several degrees above the dew point of the fluidising medium. Irradiation of the fluidised contents of the reactor was carried out by surrounding the reactor with eight sources of Cobalt 60 of 250 curies each delivering a nominal dose of 1.7 rads per hour and irradiation was continued until a total dose as set out in Table VI had been delivered. At the completion of the irradiation the particles in the reactor were extracted with methanol to remove undesired homopolymer, dried and weighed. The degree of grafting of acrylic acid was calculated from the weight increase. The presence of polyacrylic acid in the product was confirmed by infrared spectroscopy and the formation of a discrete shell of polyacrylic acid surrounding the polyethylene nucleus was confirmed by microscopy. The degree of garfting achieved is set out in Table VI.

a 2000 ml. flanged flask fitted with a stirrer, gas inlet tube, heating coil and condenser 200 g. of spherical particles as described in Table VIII was charged. Styrene, stabilized with 0.2% of its weight of hydroquinone, was then added in quantity sufficient to cover the particles. The contents of the flask were stirred, the flask was purged with nitrogen

TABLE VI.—VAPOUR PHASE GRAFTING OF ACRYLIC ACID ON TO POLYETHYLENE SUBSTRATES

| Example No.: | Weight of polyethylene substrate used, g. | Particle fraction classified on B.S.S. sieve | | Filler in substrate | Substrate from Example number | Degree of cross-linking, percent | Dose delivered, megarad | Temp. of fluidising medium, °C. | Temp. of reactor contents, °C. | Degree of grafting, percent |
|---|---|---|---|---|---|---|---|---|---|---|
| | | Passed mesh number | Retained on mesh number | | | | | | | |
| 64 | 200 | 22 | 36 | Nil | | | 1.20 | 15 | 18 | 0.74 |
| 64A | 200 | 22 | 36 | Nil | | | 0.25 | 18 | 20.9 | 1.14 |
| 65 | 200 | 22 | 36 | Nil | | | 0.35 | 15 | 18 | 0.97 |
| 66 | 200 | 22 | 36 | Nil | 57 | 5.1 | 0.21 | 19.5 | 27 | 2.31 |
| 67 | 200 | 22 | 36 | Nil | 56 | 5.7 | 0.25 | 14 | 18.5 | 1.06 |
| 68 | 112 | 52 | 100 | Nil | | | 0.10 | 18.5 | 19.5 | 1.57 |
| 69 | 116 | 52 | 100 | Nil | | | 0.20 | 18.5 | 19.5 | 3.43 |
| 70 | 119 | 52 | 100 | Nil | | | 0.30 | 18.5 | 19.5 | 4.74 |
| 71 | 116 | 52 | 100 | Nil | | | 0.40 | 19 | 20 | 5.50 |
| 72 | 400 | 52 | 100 | Nil | | | 1.08 | 25 | 30 | 8.74 |
| 73 | 240 | 52 | 100 | Nil | 58 | 6.1 | 0.30 | 29 | 30 | 4.71 |
| 74 | 200 | 52 | 100 | Nil | 59 | 8.4 | 0.34 | 19 | 21 | 3.71 |
| 75 | 270 | 52 | 100 | Nil | 58 | 6.1 | 1.02 | 22 | 24 | 9.1 |
| 76 | 200 | 22 | 36 | 16.6% w./w. $TiO_2$ | | | 0.15 | 19 | 20 | 1.24 |
| 77 | 400 | 22 | 36 | 16.6% w./w. $TiO_2$ | | | 1.06 | 20 | 24 | 7.04 |
| 78 | 400 | 22 | 36 | 16.6% w./w. $TiO_2$ | | | 1.17 | 22.5 | 24 | 7.17 |
| 79 | 200 | 22 | 36 | 16.6% w./w. $TiO_2$ | 63 | 5.5 | 0.18 | 22.5 | 24 | 1.76 |
| 80 | 200 | 22 | 36 | 16.6% w./w. $TiO_2$ | 60 | 7.6 | 1.21 | 21 | 27.5 | 7.46 |
| 81 | 200 | 52 | 100 | 16.6% w./w. $TiO_2$ | | | 0.05 | 16.5 | 18.5 | 0.45 |
| 82 | 200 | 52 | 100 | 16.6% w./w. $TiO_2$ | | | 0.10 | 19.5 | 21.5 | 0.92 |
| 83 | 200 | 52 | 100 | 16.6% w./w. $TiO_2$ | | | 0.15 | 19 | 20 | 2.04 |
| 84 | 400 | 22 | 36 | 63.5% w./w. $ZrO_2$ | | | 1.17 | 22.5 | 26.5 | 4.67 |
| 85 | 500 | 36 | 52 | 63.5% w./.w $ZrO_2$ | | | 1.21 | 21 | 26.5 | 5.84 |
| 86 | 260 | 52 | 100 | 63.5% w./w. $ZrO_2$ | | | 0.27 | 17 | 19.5 | 0.55 |
| 87 | 260 | 52 | 100 | 63.5% w./w. $ZrO_2$ | | | 0.40 | 18 | 19.5 | 2.11 |

EXAMPLES 88 TO 91 INCLUSIVE

These examples demonstrate the preparation of copolymers in which vapourized styrene is grafted onto polyethylene nuclei. The apparatus and procedure described in Examples 64 to 87 inclusive was used except that the acrylic acid of those examples was replaced by styrene and for each example 200 g. of nucleus particles were used. Details are set out in Table VII. The presence of polystyrene in the product was confirmed by infra-red spectroscopy and the formation of a discrete shell of polystyrene surrounding the nucleus was confirmed by miscroscopy.

for 30 minutes, the contents were heated to the temperature set out in Table VIII, and irradiated from a Cobalt 60 source at a dose rate of $1.7 \times 10^5$ rads per hour until the dose set out in Table VIII was delivered. At completion of the irradiation the product was separated by filtration, washed with benzene until free of extractable homopolymer, leached with methanol over a period of 16 hours, filtered and dried under vacuum at 60° C. for 72 hours. The degree of grafting achieved expressed in parts by weight of the outer copolymeric shell per 100 parts of complete particle is set out in Table VIII. The presence

TABLE VII.—VAPOUR PHASE GRAFTING OF STYRENE ON TO POLYETHYLENE SUBSTRATES

| Example No. | Nucleus | Dose delivered, megarad | Temperature of reactor contents, °C. | Degree of grafting, percent |
|---|---|---|---|---|
| 88 | The product obtained in Example 60 | 0.525 | 50 | 6.3 |
| 89 | do | 1.0 | 50 | 15.6 |
| 90 | The nucleus used in Example 85 | 0.525 | 50 | 5.3 |
| 91 | The product obtained in Example 58 | 0.83 | 50 | 25.6 |

EXAMPLES 92 TO 97 INCLUSIVE

The examples demonstrate the preparation of copolymers in which styrene in liquid form is grafted to a polyolefinic nucleus using a direct irradiation method. Into of polystyrene in the product was confirmed by infrared spectroscopy and the formation of a discrete shell of polystyrene surrounding the nucleus was confirmed by microscopy.

TABLE VIII.—LIQUID PHASE GRAFTING OF STYRENE ON TO POLYOLEFINIC SUBSTRATES

| Example No. | Polymer | Description of Spherical Polyolefinic Nuclei | Temperature of reaction, °C. | Dose delivered, megarads | Degree of grafting, percent |
|---|---|---|---|---|---|
| 92 | Polypropylene | Sieve fraction passing 22 mesh BSS Sieve. Retained on 36 mesh BSS Sieve | 29 | 0.071 | 2.95 |
| 93 | Polyethylene | Sieve fraction as for Example 92. Contained 63.5% $ZrO_2$ | 29 | 0.354 | 6.83 |
| 94 | do | Sieve fraction as for Example 92. Contained 16.6% $TiO_2$ | 29 | 0.028 | 0.80 |
| 95 | do | As for Example 94 | 29 | 0.17 | 4.6 |
| 96 | do | Sieve fraction passing 36 mesh BSS Sieve. Retained on 52 mesh BSS Sieve. Contained 16.6% $TiO_2$. | 29 | 0.36 | 10.9 |
| 97 | do | As for Example 94 and cross-linked equivalent to 1.3% divinylbenzene in the product. | 29 | 2.72 | 56.5 |

EXAMPLES 98 TO 130 INCLUSIVE

These examples demonstrate the preparation of new graft copolymers by a direct irradiation method using polytetrafluoroethylene as a substrate and monomers and media which do not swell the substrate. For each example the reactor was a Quickfit MF 24/3 test tube provided with a MF 11/3 stopper and tap, and the reactor was changed with polytetrafluoroethylene discs of 0.5" diameter and a thickness of 0.01". Total weight of the discs was between 2 and 3 g. For each monomer used three examples are shown in Table IX. The total volume of the reaction medium added to the charged reactor, i.e. monomer plus solvent, if any, was 5 ml. The reactor and its contents were then stoppered and freeze degassed in two cycles using liquid nitrogen to a pressure of 0.01 mm. Hg. The reactor and its contents were then irradiated at room temperature using a Cobalt 60 source delivering a dose at the rate of $1.7 \times 10^5$ rads per hour until a nominal dose of 10 megarads was delivered.

After irradiation the discs were removed from the reactor, washed with methanol, then with benzene to remove the homopolymer formed, then again with methanol, dried in vacuo for 24 hours at 65° C. and weighed. The presence of the stated grafted polymer in the product was confirmed by infrared spectroscopy, and by using microscopy and a staining technique the formation of a discrete grafted polymer in the form of a shell surrounding the disc was confirmed. There were thus obtained graft copolymers useful as ion exchange media. Details are set out in Table IX.

EXAMPLES 131 TO 141 INCLUSIVE

These examples demonstrate the preparation of new graft copolymers by a direct irradiation method using as a substrate either the polytetrafluoroethylene discs described in Examples 98 to 130 (total weight of substrate used 2.5 g.) or the particles of cross-linked polyethylene prepared in Example 56 (total weight of nucleus particles used 4 g.). The apparatus and method used was as described in Examples 98 to 130 except that the total dose of radiation delivered was varied in amount. Details are set out in Table X. The presence of the appropriate grafted polymer in the product was confirmed by infrared spectroscopy and the formation of a discrete grafted polymer in the form of a shell surrounding the substrate was confirmed by microscopy. There were thus obtained graft copolymers useful as ion exchange media.

TABLE X

| Example No.: | Substrate type | Monomer used | Dose delivered, megarad | Graft obtained, percent |
|---|---|---|---|---|
| 131 | Polytetrafluoroethylene (PTFE) | N(1-isobutenyl)piperidine | 20 | 1.2 |
| 132 | Polyethylene (PE) | do | 20 | 0.31 |
| 133 | PE | α-Chloromethylvinylbenzene | 1 | 5.53 |
| 134 | PE | Propenylpiperidine | 1 | 0.8 |
| 135 | PTFE | N-vinylpiperidine | 1 | 0.9 |
| 136 | PE | do | 1 | 2.54 |
| 137 | PTFE | 2-propenylamine | 1 | 0.19 |
| 138 | PE | do | 1 | 0.23 |
| 139 | PE | Vinylmethylbenzylamine | 12 | 1.09 |
| 140 | PE | Diallylamine hydrochloride [1] | 10 | 0.62 |
| 141 | PE | Diallylmethylamine hydrochloride [1] | 10 | 1.03 |

[1] It is considered, in accordance with Negi, Harada and Ishizuka, J. Pol. Sc. Part A-1, Vol. 5, p. 1951–65/1967, that the mer units formed are:

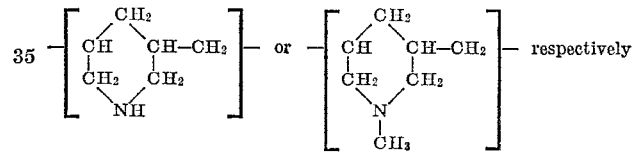

respectively

EXAMPLES 142 TO 148 INCLUSIVE

The procedure and apparatus of Examples 131 to 141 was used to prepare graft copolymers using the substrate and monomers set out in Table XI. Results are set out in Table XI. The presence of the appropriate grafted polymer in the product in the form of a discrete shell was de-

TABLE IX.—COPOLYMERS HAVING POLYTETRAFLUOROETHYLENE AS A SUBSTRATE

| Example No.: | Monomer Volume, ml. | Monomer Type | Solvent Volume, ml. | Solvent Type | Graft obtained, percent |
|---|---|---|---|---|---|
| 98 | 5 | Allyl dimethylamine | Nil | | 0.18 |
| 99 | 2.5 | do | 2.5 | CH₃OH | 0.13 |
| 100 | 2.5 | do | 2.5 | C.Cl₄ | 0.54 |
| 101 | 5 | Allyl chloride | Nil | | 1.01 |
| 102 | 2.5 | do | 2.5 | CH₃OH | 0.94 |
| 103 | 2.5 | do | 2.5 | C.Cl₄ | 0.82 |
| 104 | 5 | Allyl diethanolamine | Nil | | 1.16 |
| 105 | 2.5 | do | 2.5 | CH₃OH | 0.53 |
| 106 | 2.5 | do | 2.5 | C.Cl₄ | 0.96 |
| 107 | 5 | Allyl diethylamine | Nil | | 0.37 |
| 108 | 2.5 | do | 2.5 | CH₃OH | 1.10 |
| 109 | 2.5 | do | 2.5 | C.Cl₄ | 1.17 |
| 110 | 5 | Allyl morpholine | Nil | | 0.44 |
| 111 | 2.5 | do | 2.5 | CH₃OH | 0.65 |
| 112 | 2.5 | do | 2.5 | C.Cl₄ | 1.14 |
| 113 | 5 | Vinyl bromide | Nil | | 3.92 |
| 114 | 2.5 | do | 2.5 | CH₃OH | 2.05 |
| 115 | 2.5 | do | 2.5 | C.Cl₄ | 0.65 |
| 116 | 5 | Vinyl-2-chlorethylether | Nil | | 2.85 |
| 117 | 2.5 | do | 2.5 | CH₃OH | 0.95 |
| 118 | 2.5 | do | 2.5 | C.Cl₄ | 1.17 |
| 119 | 5 | 2-vinyl pyridine | Nil | | 3.3 |
| 120 | 2.5 | do | 2.5 | CH₃OH | 13.06 |
| 121 | 2.5 | do | 2.5 | C.Cl₄ | 0.21 |
| 122 | 5 | 4-vinyl pyridine | Nil | | 4.5 |
| 123 | 2.5 | do | 2.5 | CH₃OH | 11.0 |
| 124 | 2.5 | do | 2.5 | C.Cl₄ | 1.77 |
| 125 | 5 | Allyl piperidine | Nil | | 0.19 |
| 126 | 2.5 | do | 2.5 | CH₃OH | 0.57 |
| 127 | 2.5 | do | 2.5 | C.Cl₄ | 1.18 |
| 128 | 5 | N-(β-vinyloxyethyl)piperidine | Nil | | 0.22 |
| 129 | 2.5 | do | 2.5 | CH₃OH | 0.42 |
| 130 | 2.5 | do | 2.5 | C.Cl₄ | 1.48 | termined as described in Examples 131 to 141. There were thus obtained graft copolymers useful as ion exchange media.

Each resultant liquid was cooled below 20° C. and 100 g. of particles of poly(ethylene-g-chloromethyl styrene) as set out in Table XIII was slowly added with stirring. After

TABLE XI

| | Substrate type | Monomer and solvent used | Dose delivered, megarad | Graft obtained, percent |
|---|---|---|---|---|
| Example No.: | | | | |
| 142 | PTFE | 10% solution of vinyldiethylamine in ether | 1 | 0.10 |
| 143 | PE | ____do____ | 1 | 0.55 |
| 144 | PTFE | 40% solution of vinyldiethylamine in n-hexane.[1] | 1 | 0.88 |
| 145 | PE | ____do.[1]____ | 1 | 0.28 |
| 146 | PE | 70% solution of N-vinylpiperidine in hexane | 14 | 2.54 |
| 147 | PE | 15% solution of diallyldiethylammonium chloride in dimethylsulphoxide.[2] | 20 | 1.21 |
| 148 | PE | 30% solution of diallyldiethylammonium chloride in methanol.[2] | 20 | 0.58 |

[1] Irradiation was performed at 38° C.
[2] It is considered that the mer units formed are:

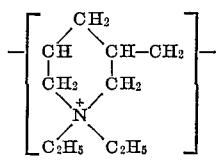

EXAMPLES 149 TO 156 INCLUSIVE

These examples demonstrate a method by which chloromethyl groups are introduced into our copolymers. A 2000 ml. flask fitted with a stirrer, condenser, thermometer and calcium chloride drying tube was charged with 250 g. of the particles set out in Table XII. 350 ml. chloromethyl methyl ether was added and the mixture was stirred at room temperature for one hour. Freshly prepared anhydrous zinc chloride in amounts as set out in Table XII was added, the mixture was then heated with stirring to 50° C. and maintained at this temperature for the periods set out in Table XII. The mixture was then cooled, the particles were separated by filtration, washed in succession with dioxan, aqueous dioxan, dioxan containing 10% v./v. of concentrated hydrochloric acid, aqueous dioxan until free of chloride, dioxan, dioxan-methanol mixtures of increasing methanol concentration and finally with pure methanol. The resultant product was dried under vacuum for 24 hours and weighed. The presence of chloromethyl groups in the products was confirmed by intrared spectroscopy.

Example 156, using a prior art graft copolymer was prepared as a control example for the purpose of comparison.

TABLE XII.—CHLOROMETHYLATION POLY(ETHYLENE G-STYRENE)

| Example No. | Poly(ethylene-g-styrene) from Example No. | Grafted polystyrene, percent | Zinc chloride, g. | Reaction time, hr. | Chloromethylation, percent |
|---|---|---|---|---|---|
| 149 | 88 | 6.3 | 25 | 2 | 74 |
| 150 | 91 | 25.6 | 102 | 18 | 90 |
| 151 | 93 | 6.83 | 27 | 18 | 104 |
| 152 | 89 | 15.6 | 62 | 18 | 106 |
| 153 | 97 | 56.5 | 226 | 18 | 103 |
| 154 | 97 | 56.5 | 113 | 15 | 65 |
| 155 | 90 | 5.33 | 5 | 3 | 23 |
| 156 [1] | 167 | 35 | 140 | 18 | 67 |

[1] Prior art.

EXAMPLES 157 TO 162 INCLUSIVE

These examples demonstrate the amination of poly (ethylene-g-chloromethyl styrene) to give copolymers which are suitable for use as ion exchange resins. To a 1000 ml. flask provided with a stirrer, thermometer and condenser either:

(A) 200 ml. diethylamine, or
(B) 100 ml. diethylamine in 300 ml. dioxane was added.

the addition of the particles was completed the stirred mixture was either:

(C) maintained at room temperature for seven days or
(D) maintained at 50° C. for four days.

The methods used are set out in Table XIII. The particles were separated from the suspension by filtration, steeped in an excess of 2 N HCl for one day, washed with water until free of chloride, steeped in an excess of 0.1 N NaOH for several days, washed with 0.1 N NaOH till free of chloride, washed with water and stored in a damp condition. The presence of tertiary amino groups in the product was confirmed by infrared spectroscopy.

Example 162 is a prior art example, prepared as a control for the purpose of comparison.

TABLE XIII.—AMINATION OF POLY(ETHYLENE-G-CHLOROMETHYL STYRENE)

| | Poly(ethylene-g-chloromethyl styrene) from Example No. | Method used |
|---|---|---|
| Example No.: | | |
| 157 | 153 | A and C. |
| 158 | 155 | A and D. |
| 159 | 155 | B and D. |
| 160 | 150 | Do. |
| 161 | 152 | Do. |
| 162 (Prior art) | 156 | Do. |

EXAMPLE 163

This example demonstrates the introduction of quaternary ammonium groups into a copolymer by reacting a chloromethylated copolymer with a tertiary amine. 40 g. of particles obtained in Example 150 were added to 80 ml. water held in a 1000 ml. flask fitted with a stirrer and a condenser. The suspension was stirred and over a period of four hours, 100 ml. of a 25% solution of trimethylamine in water was added to it while the temperature was maintained at 20° C. The mixture so prepared was heated further for 18 hours at 25 to 30° C. The particles obtained were separated by filtration, washed with water, steeped in methanol, separated by filtration, and dried under vacuum at 60° C. for 16 hours. The presence of a quaternary ammonium group in the product was confirmed by titration. There was thus obtained a copolymer containing quaternary ammonium groups suitable for use as an anion exchange resin and having a capacity of 1.6 m. eq./g.

EXAMPLE 164

Spherical polyethylene particles, having a melt flow index of 7, containing 16.6% $TiO_2$, and passing a 22 mesh BSS sieve but retained on a 36 mesh BSS sieve were used as nuclei in this example. 127 g. of these particles were placed in a 250 ml. round bottom flask provided with a stopper and tap. Sufficient vinyl-2-chloroethyl ether was added to the flask to cover the particles. The contents of the flask were degassed twice to 0.01 mm. Hg using liquid nitrogen as a coolant and then irradiated with Cobalt 60 gamma rays until a total dose of 12.6 megarads had been delivered. After the irradiation the particles were steeped in a large excess of diethylamine and shaken for 18 hours, separated by filtration and washed with diethylamine to remove the red coloured material formed during the reaction until the filtrate was clear and colourless. 20 g. of the particles so obtained were heated under reflux with an excess of diethylamine for four days and the resultant particles were recovered as described in Examples 157 to 162. There was thus obtained a copolymer suitable for use as an ion exchange resin which had an equilibrium capacity of 0.27 m. eq./g.

EXAMPLE 165

Example 164 was repeated but instead of refluxing the particles with an excess of diethylamine for four days they were heated for three hours in an autoclave with an excess of diethylamine at 85 to 90° C. There was thus obtained a copolymer suitable for use as an ion exchange resin which had an equilibrium capacity of 0.71 m. eq./g.

EXAMPLE 166

Example 164 was repeated but instead of refluxing the particles with an excess of diethylamine, they were refluxed with an excess of ethanolamine for four days. There was thus obtained a copolymer suitable for use as an ion exchange resin which had an equilibrium capacity of 1.26 m. eq./g.

EXAMPLE 167

This example is a control experiment for comparative purposes. It demonstrates the preparation of a graft copolymer of polyethylene and styrene using a prior art process. 650 g. of spherical polyethylene particles having a melt flow index of 7, containing 16.6% $TiO_2$, and passing a 22 mesh BSS sieve but retained on a 36 mesh BSS sieve, were placed in a tumbling barrel and irradiated with a Cobalt 60 source to a total dose of 20 megarads. The peroxidized particles were then soaked for about 3 days in a mixture of 1425 ml. styrene and 71 ml. commercial divinylbenzene containing 50% divinylbenzene at 25–30° C. The excess liquid was filtered off and a weight increase of 50% (based on the original weight) in the particles was noted. 200 g. of the swollen particles containing 33.3% of styrene and divinylbenzene were placed in a mixture of 200 g. water, 1.33 g. hydroxyapatite and 0.053 g. of sodium dodecylbenzene sulphonate and the dispersion was heated while stirring to 75° C. for 14 hours followed by heating at 90–95° C. for 24 hours. The particles were filtered off, washed with water, aqueous hydrochloric acid (pH 2.5), then with water until free of chloride and finally with methanol. The particles were dried in vacuo at 65° C. and weighed. The increase in weight of the resultant product over that of the original particles was 31%. The presence of polystyrene in the product was confirmed by infra-red spectroscopy. The product was chloromethylated by the method described in Example 156, aminated by the method described in Example 162, stained with Durazol Paper Blue 10 GS and examined visually by the method described in Example 182. The whole particle was coloured blue demonstrating that the copolymer had ion exchange reactive groups distributed throughout the particle; no localisation of graft on the surface was observed.

EXAMPLE 168

This example demonstrates the introduction of sulphonic acid groups into our copolymers; the technique itself is known. 150 g. of particles obtained in Example 89 were immersed in 100 g. of chlorosulphonic acid and heated with stirring at 60–70° C. until no more HCl was liberated. The mixture was then poured into a 30% $H_2SO_4$ solution, filtered and the particles poured into a 10% $H_2SO_4$ solution followed by a 3% $H_2SO_4$ solution. The particles were then recovered by filtration. There was thus obtained a sulphonated cation exchange resin in particle form which had an equilibrium capacity of 2.9 m. eq./g.

EXAMPLE 169

This example is a control, for comparative purposes, and demonstrating a prior art ion exchange graft copolymer with sulphonic acid groups, based on prior art copolymer of Example 167. The product of Example 167 was treated as described in Example 168. There was thus obtained a sulphonated cation exchange resin in particle form which had an equilibrium capacity of 2.73 m. eq./g.

EXAMPLES 170–177 INCLUSIVE

This example demonstrates the use of certain of our copolymers as ion exchange media for comparison with prior art resins. The method used for the determination of rate of up-take is that described by D. E. Weiss et al. in Aust. J. Chem. 1966 19 561–87. The solution used as a source of ions was 0.1 N HCl containing 1100 p.p.m. of NaCl. The equilibrium capacity of the copolymers and resins, and expressed as m. eq./g., and the time taken to reach certain percentages of the equilibrium capacity were determined. These results together with the identification and particle size, of the copolymers are set out in Table XIV. Examples 175, 176 and 177 are prior art examples.

TABLE XIV.—EQUILIBRIUM CAPACITY AND EXCHANGE RATE OF WEAKLY BASIC COPOLYMERS

| Example No. | Source of copolymer Example No. | Sieve fraction | | Equilibrium capacity, m.eq./g. | Percent equilibrium capacity reacted after— | | | | | |
|---|---|---|---|---|---|---|---|---|---|---|
| | | Passed B.S.S. Sieve No. | Retained on B.S.S. Sieve No. | | 1 min. | 2 mins. | 3 mins. | 5 min. | 10 mins. | 60 mins. |
| 170 | 157 | 22 | 36 | 1.32 | 38 | 43 | 47 | 52 | 63 | 95 |
| 171 | 158 | 22 | 36 | 0.92 | 27 | 36 | 44 | 52 | 67 | 94 |
| 172 | 159 | 22 | 36 | 2.44 | 12 | 16 | 20 | 25 | 36 | 67 |
| 173 | 160 | 52 | 100 | 1.31 | 5 | 13.5 | 19 | 26 | 35 | 80 |
| 174 | 161 | 22 | 36 | 0.24 | 4 | 6 | 8 | 10 | 14 | 38 |
| 175 | ¹ 162 | 22 | 36 | 0.90 | 12 | 14 | 18 | 21 | 25 | 43 |
| 176 | (²) | 16 | 18 | 4.0 | 2.5 | 2.5 | 3.5 | 4.5 | 7.5 | 20 |
| 177 | (³) | 14 | 52 | 4.0 | 5 | 10 | 12.5 | 15 | 22 | 32 |

¹ Prior art.
² Commercial "Deacidite" G (prior art).
³ Commercial "Deacidite" G(IP) (prior art).

EXAMPLE 178

This example demonstrates the equilibrium capacity of certain of our copolymers when they are used as ion exchange resins together with the percentage of the equilibrium capacity achieved at various time intervals after commencing the ion exchange process. 0.10 milliequivalent of copolymer as set out in Table XV was placed in a series of 2 oz. sample bottles and to these were added 20.0 ml. of an aqueous solution of NaCl containing 1100 p.p.m. NaCl. The bottles were then sealed with a serum cap and screw top and the contents were shaken for 2 days. 20.0 ml. of 0.01 N NaOH was added to the contents, the bottles were re-sealed and shaken for periods of time set out in Table XV. At the end of each period the contents of each bottle were filtered, a 10.0 ml. aliquot of the filtrate was titrated with 0.01 N HCl and the amount of NaOH reacting with the copolymer was thus calculated. The value obtained from the sample shaken with NaOH for 2 days was taken as the equilibrium capacity of the copolymer and the values obtained for the shorter periods were expressed as a percentage of the equilibrium capacity. From these data the rate of reaching equilibrium could be calculated in good approximation.

TABLE XV.—RATE OF ACHIEVING EQUILIBRIUM CAPACITY USING POLY(ETHYLENE-G-ACRYLIC ACID) AS AN ION EXCHANGE RESIN

| Copolymer from Example No. | Equilibrium capacity, m.eq./g. | Percentage equilibrium capacity achieved after— | | | |
|---|---|---|---|---|---|
| | | 1 min. | 2 mins. | 5 mins. | 2 days |
| 65 | 0.19 | 73 | 76 | 79 | 100 |
| 66 | 0.19 | 46 | 59 | 72 | 100 |
| 67 | 0.09 | 56 | 63 | 77 | 100 |
| 70 | 0.49 | 38 | 52 | 63 | 100 |
| 75 | 0.89 | 68 | 71 | 73 | 100 |
| 75 | 0.89 | 68 | 71 | 73 | 100 |
| 79 | 0.86 | 81 | 86 | 93 | 100 |
| 80 | 0.80 | 57 | 69 | 82 | 100 |
| 84 | 0.44 | 61 | 71 | 81 | 100 |

EXAMPLE 179

This example demonstrates the suitability of certain of our copolymers for use as ion exchange resins in an ion exchange process operating on a continuous basis. The apparatus consisted of a 50 ml. column supported on a sintered glass disc and connected at the top through three electromagnetic valves and three flow meters to three overhead tanks containing distilled water, 0.1 N HCl and 0.1 N NaOH respectively. At the bottom the column was connected through a regulating tap to a conductivity flow cell. The electromagnetic valves were connected to a timing device so adjusted that the liquid flowed through the column in the following cycle and sequence: Distilled water—for 4 minutes; hydrochloric acid—for 4 minutes; distilled water—for 4 minutes; sodium hydroxide—for 4 minutes. This sequence was repeated automatically for many cycles and recorded on a counter. The flow of liquid through the column was regulated to one bed volume per minute. The conductivity of the effluent was recorded. Copolymers obtained in Examples 65, 66, 77, 80, 84 and 158 were submitted to 5000 cycles at room temperature. In each case the microscopic appearance, particle size and equilibrium capacity of the copolymer showed no significant change after 5000 cycles.

EXAMPLE 180

This example demonstrates the suitability of our copolymers for use as ion exchange resins in the so-called "Sirotherm" process. A mixture of particles consisting of 67 g. of the product prepared in Example 75 together with 13 g. of the product prepared in Example 160 was equilibrated for two days at room temperature with an aqueous solution having a pH of 5.8 and containing 1100 p.p.m. NaCl. The particles were separated from the solution by filtration, added to 90 ml. of saline solution containing 1100 p.p.m. NaCl and the mixture was heated at 80° C. for 10 minutes. The mixture was then filtered hot and the filtrate was shown to contain 2000 p.p.m. NaCl. This demonstrates that on heating electrolyte will be released and that thereby a higher proportion of the ion exchange resin capacity is rapidly regenerated.

EXAMPLE 181

Example 94 was repeated, but 840 ml. of methanol was added to the contents of the flask prior to irradiation and the total dose delivered was increased to 0.51 megarad. The degree of grafting obtained was 27%. The product so obtained was chloromethylated as described in Examples 149 to 156 and aminated as described in Example 158. Microscopic examination of the product so obtained by the method described in Example 182 showed that the particles had a blue shell about 53 micron in thickness surrounding a nucleus having a diameter of 400 micron. The line of demarcation between shell and nucleus was sharp and there was no evidence that the shell component had diffused into the nucleus. When used as an ion exchange resin the product had a capacity of 0.75 m. eq./g. and the percentage of the equilibrium capacity attained as determined by the method described in Examples 170 to 177 was 41, 53 and 70% after 1, 2 and 5 minutes respectively.

EXAMPLE 182

The copolymers set out in Table XVI were stained as follows. One sample each of the copolymers suitable for use as anion exchange resins was soaked in a 2% cuprammonium solution in water for one hour and another one was equilibrated for 72 hours in an aqueous solution containing 1% of a blue dye available commercially from Imperial Chemical Industries Ltd. under the trade name of "Durazol" Paper Blue 10GS. One sample each of the copolymer suitable for use as cation exchange resins was soaked in a 2% copper sulphate solution for one hour and another one was equilibrated for 72 hours in an aqueous solution containing 1% of a blue dye available commercially from Imperial Chemical Industries Ltd. under the trade name of Methylene Blue 2BN 200. After the staining treatment the particles were washed with water, dried under vacuum for 24 hours, dissected and mounted so that a cross-sectional diameter of a particle was exposed. The exposed portion of the mounted particle was examined microscopically. Where the staining had been carried out by complexing copper with the copolymer the product was examined on a Japan Electron Optics microelectron beam probe microscope Type JXA 3/11 which scanned across the exposed diameter and recorded the copper density across the particle. Where the staining had been done with a blue dye a visual microscope fitted with a camera was used and a photograph of the particle was projected on to a calibrated screen. In both methods of inspection the position of the portion of the particle containing ion exchange reactive groups was indicated by a blue stain. In the copolymers made according to this invention a sharply defined blue annulus could be observed surrounding a circular substrate which was entirely free from blue colour. In the prior art ion exchange resin the whole of the particle was coloured blue.

This example demonstrates that in our copolymers the graft was localised entirely on the surface and that ion exchange reactive groups were entirely absent from the nucleus. This is in distinction from the prior art resins which have ion exchange reactive groups distributed therethrough the particle and in which no localisation of graft on the surface takes place. The thickness of the annulus on particles having an overall diameter of 500 microns is set out in Table XVI.

TABLE XVI

| Particles obtained from— Example Nos. | Thickness of annulus (microns) |
|---|---|
| 78 | 10 |
| 79 | 14 |
| 157 | 94 |
| 158 | 72 |
| 166 | 14 |
| 167 (prior art) | No annulus |
| Commercially available "Deacidite" G | No annulus |

We claim:
1. A graft copolymer resin in particulate form comprising a discrete polymeric nucleus selected from the group consisting of low and high density polyethylenes, polypropylene, polybutene, poly-4-methylpentene-(-1), polytetrafluoroethylene, polyvinyl chloride, polyvinyl fluoride, polyvinylidene chloride, polystyrene, poly- acrylates and polymethacrylates, which has grafted on to it and surrounding it a substantially non-crosslinked graft-copolymeric layer which is graft-copolymerized from a monomer selected from the group consisting of alpha-olefins carrying an ion exchange reactive group selected from the group consisting of sulphonic, phosphonic, phosphinic, thiophosphonic, arsonic, carboxy, primary, secondary or tertiary amine, quaternary ammonium, phosphonium, tertiary sulphonium and metal chelating groups, said nucleus being free from ion exchange sites and non-reactive in ion exchange reactions and said graft copolymeric layer comprising between 0.1 and 55% by weight of the copolymer particle and acting as an ion exchange medium.

2. Shaped graft copolymer resins comprising a polymeric nucleus selected from the group consisting of low and high density polyethylenes, polypropylene, polybutene, poly-4-methylpentene-(-1), polytetrafluoroethylene, polyvinyl chloride, polyvinyl fluoride, polyvinylidene chloride, polystyrene, polyacrylates and polymethacrylates having grafted on to and around it an outer polymeric shell which is graft-copolymerized from a monomer selected from the group consisting of alpha-olefins carrying an ion exchange reactive group selected from the group consisting of sulphonic, phosphonic, phosphinic, thiophosphonic, arsonic, carboxy, primary, secondary or tertiary amine, quaternary ammonium, phosphonium, tertiary sulphonium and metal chelating groups, characterized in that substantially the whole of the nucleus is free from the co-mer units forming the outer shell and is insoluble and substantially non-swelling in the monomer or medium used in the grafting process of the outer shell, and characterized further in that the polymeric shell is substantially non-cross-linked, is covalently bonded to the polymeric nucleus, and surrounds it substantially symmetrically, and wherein said graft copolymer layer comprises between 0.1 and 55% by weight of the copolymer particles and acts as an ion exchange medium.

3. Shaped graft copolymer resin according to claim 2 wherein the outer shell comprises between 2 and 30% by weight of the copolymer particle.

4. Shaped graft copolymer resin according to claim 2 wherein the nucleus is cross-linked.

5. Graft copolymeric resin particles according to claim 2 in the shape of spherical or quasispherical beads having a diameter from 0.1 to 2 mm., a ratio of total radius R to radius of the inert polymeric nucleus r between 0.9996 and 0.765 and a highly uniform thickness (R–r) of the outer graft copolymeric shell.

6. A shaped copolymeric resin particle according to claim 2 of the generic formula

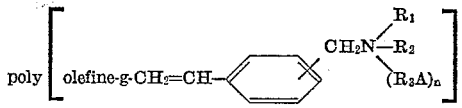

wherein $R_1$ and $R_2$, separately, are hydrogen or alkyl and $n=0$ or, whenever $R_1$ and $R_2$ are alkyl, $R_3$ is also alkyl, $n=1$ and A is an anion bonded to the quaternary ammonium cation so formed and where the polyolefine nucleus is free from ion exchange sites.

7. A shaped copolymeric resin particle according to claim 2 of the generic formula poly[olefine-g-(acrolein-co-allylamine)] wherein allylamines are

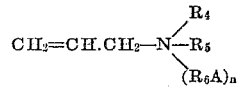

and $R_4$ and $R_5$ separately, may be hydrogen or alkyl and $n=0$ or whenever $R_4$ and $R_5$ are alkyl, $R_6$ is also alkyl, $n=1$ and A is an anion bonded to the quaternary ammonium cation so formed.

8. A shaped copolymeric resin particle according to claim 2 of the generic formula poly[olefine-g-allyl-Z] wherein Z is —$NR_7R_8$, dialkylallylammonium, alkylallylamine salts,

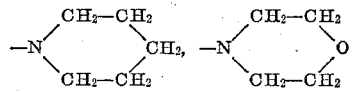

and $R_7$ and $R_8$, separately, are alkyl, alkylol or hydrogen and $R_7$ may also be allyl.

9. A shaped copolymeric resin particle according to claim 2 of the generic formula poly[olefine-g-vinyl-Y] wherein Y is

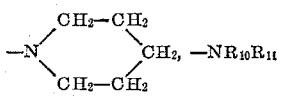

where $R_{10}$ and $R_{11}$, separately, are alkyl or alkaryl.

References Cited

UNITED STATES PATENTS

| | | | |
|---|---|---|---|
| 2,956,899 | 10/1950 | Claine | 117—47 |
| 2,999,056 | 9/1961 | Tanner | 204—154 |
| 3,115,418 | 12/1963 | Magat et al. | 117—47 |
| 3,247,133 | 4/1966 | Chen | 260—2.1 |
| 3,252,880 | 5/1966 | Magat et al. | 204—154 |
| 3,252,921 | 5/1966 | Hansen et al. | 260—2.2 |
| 3,298,942 | 1/1967 | Magat et al. | 204—159.17 |
| 3,298,969 | 1/1967 | D'Alelio | 260—2.1 |

OTHER REFERENCES

Egorov et al., Dokl. Akad. Nauk. SSSR 146, 1360–62 (1962) (Abstr. supplied).

WILLIAM H. SHORT, Primary Examiner

M. GOLDSTEIN, Assistant Examiner

U.S. Cl. X.R.

204—159.15, 159.17; 260—2.2, 2.5, 878, 884, 885, 886